(12) United States Patent
Gunasekaran

(10) Patent No.: US 12,548,464 B2
(45) Date of Patent: Feb. 10, 2026

(54) TILE BASED LOGICAL TEACHING DEVICE

(71) Applicant: Mindwatts LLC, Shorewood, MN (US)

(72) Inventor: Keerthi Gunasekaran, Shorewood, MN (US)

( * ) Notice: Subject to any disclaimer, the term of this patent is extended or adjusted under 35 U.S.C. 154(b) by 1057 days.

(21) Appl. No.: 17/496,987

(22) Filed: Oct. 8, 2021

(65) Prior Publication Data

US 2023/0096858 A1 Mar. 30, 2023

Related U.S. Application Data

(60) Provisional application No. 63/245,433, filed on Sep. 17, 2021.

(51) Int. Cl.
*G09B 19/00* (2006.01)
*G09B 23/18* (2006.01)

(52) U.S. Cl.
CPC ....... *G09B 19/0053* (2013.01); *G09B 23/186* (2013.01)

(58) Field of Classification Search
CPC .......................... G09B 19/0053; G09B 23/186
See application file for complete search history.

(56) References Cited

U.S. PATENT DOCUMENTS

2004/0232617 A1* 11/2004 Britt ...................... A63F 3/0457
273/281

FOREIGN PATENT DOCUMENTS

BR 102019009383 A2 * 11/2020

OTHER PUBLICATIONS

Albuquerque Lobato P, Educational kit for learning robotics, programming and 3d printing (translation), Nov. 17, 2020 (Year: 2020).*

* cited by examiner

*Primary Examiner* — Dmitry Suhol
*Assistant Examiner* — Jose Angeles
(74) *Attorney, Agent, or Firm* — Husch Blackwell LLP

(57) ABSTRACT

A versatile Logic teaching system comprising a plurality of interchangeable functional tile units representing binary values representing various logic functions and connector tiles linking the functional tile units. In use, functional tile units and connector tiles can be arranged to create logical circuit pathways representative of real-world scenarios. Construction of logical circuit pathways can follow one or more rules and a scoring system to engage users.

3 Claims, 12 Drawing Sheets

TILE BASED LOGICAL TEACHING DEVICE

RELATED APPLICATION

This application claims the benefit of U.S. Provisional Application No. 63/245,433 filed Sep. 17, 2021, which is hereby fully incorporated herein by reference.

TECHNICAL FIELD

Embodiments of the present disclosure relate generally to a system and method for teaching logic and more particularly to a tile based device for teaching Boolean Logic and "If this then that" (IFTTT) Logic by constructing logic circuit pathways.

BACKGROUND

Conventional systems designed to teach children coding languages and computational logic often focus on specific language platforms, have steep learning curves, or only teach navigation coding such as Forward-Backward-Left-Right-Stop type programming. For example, existing systems for constructing or coding are often virtual, requiring internet access, mobile devices, tablets, or computers and apply stringent programming syntax to manipulate operations. These traditional approaches have limited functionality and are often ineffective at teaching key fundamental logical or computer programming concepts. Further, many traditional teaching aids lack tangible non-electronic pieces that enable children to understand the basics of computational logic through physical engagement.

One area that can be particularly challenging for children and those new to coding is Boolean Logic and other logic sequences, such as IFTTT Logic, which can be user defined. Boolean Logic is a form of computation logic that is the basic building block of computation programming and algorithms. Boolean Logic is a form of algebra that is centered around three simple functions known as Boolean Operators: "Or," "And," and "Not". Boolean Logic revolves around the concept of an outcome that is either true or false, often denoted as "0" or "1" or with colors such as green or red.

Thus, there is a need for an approachable teaching device that allows for modular construction of logic circuit pathways without requiring computational devices.

SUMMARY

The present disclosure relates generally to the learning of science, technology, engineering, and mathematics (STEM), and in particular Boolean Logic circuit pathways, "If this then that" (IFTTT) type algorithms, decision making based on real life applications, where logic or logical computer programming and coding is applied to real world scenarios and challenges. Teaching Boolean and IFTTT Logic is accomplished through a tangible arrangement of tiles that depict information selection, logical circuit pathways, decision making sequences, and logical flows.

Embodiments of the present disclosure are designed to teach and help users in both developed and developing societies without using expensive electronics or requiring internet access. The present invention serves as an educational platform and tool for adults and children to engage hands-on in computer programming essentials. By designing and building logic or sequence-based tiles children, adults, and educators can apply computational logic for learning STEM concepts and simulating real-life application scenarios.

In an embodiment a system for teaching logical systems can include at least two functional tile units each including nodes representing logical function values and one or more logical segments, wherein each logical segment connects at least two nodes and represents a user defined or predetermined logical function such that each of the connected nodes represent an input node or an output node of the defined function, and at least one connector tile including a line segment sized to connect nodes of different functional tile units to create a logical circuit pathway.

In embodiments the system for teaching logical systems can further include a housing having a front surface coupled to a back surface, the front surface including one or more node apertures, wherein the housing is configured to removably receive or contain a functional tile unit between the front surface and back surface such that the nodes align with the one or more node apertures.

In embodiments, the one or more logical segments can include at least one Boolean Logic operand.

In embodiments, the at least two functional tile units of the system are circular.

In embodiments, each of the at least two functional tile units of the system include a first set of nodes on a first side and further comprises a second set of nodes on a second side.

In some embodiments, the at least two functional tile units can further comprise a plurality of foldable pages configured to have at least one of the one or more nodes of the functional tile unit. In such embodiments, each of the plurality of foldable pages can include one or more logical segments.

In embodiments, each functional tile unit can be a 3-dimensional cube with each face of each of the 3-dimensional cubes having a unique arrangement of the nodes. In embodiments, the nodes on each face of the 3-dimensional cubes can have different markings such that no two faces are the same.

In embodiments, the system for teaching logic systems can further comprising a power source. In such embodiments, each of the nodes can further comprise a light source configured to couple to the power source. In embodiments, the power source can be a direct current battery or a solar chargeable power source and the light source of each node can be an LED.

In embodiments incorporating electric components, the logical segments can further comprise conductive filaments configured to complete a circuit between the power source. In such embodiments, the at least one node and the line segments can terminate in ferro-magnetic conductive pads. In some embodiments, the conductive filaments can comprise insulated copper wiring.

In an embodiment a method for teaching logic systems can include providing a plurality of functional tile units each including nodes representing logical function values and one or more logical segments, wherein each logical segment connects at least two nodes and represents a user defined or predetermined logical function such that each of the connected nodes represent an input node or an output node of the defined function, providing a plurality of connector tiles each including at least one line segment to connect the nodes of different functional tile units, arranging a subset of the plurality of functional tile units and the plurality of connector tiles to achieve an intended logical function result while adhering to one or more rules, and scoring the arrangement based on the number of functional tile units used, the number of connector tiles used, and the utilized logical segments.

In embodiments, the scoring can further be based on the types of tiles used.

In an embodiment, a method for teaching logic systems, can include providing a plurality of functional tile units each including nodes representing logical function values and one or more logical segments, wherein each logical segment connects at least two nodes and represents a user defined or predetermined logical function such that each of the connected nodes represent an input node or an output node of the user defined function, providing a plurality of connector tiles each including at least one line segment to connect nodes of different functional tile units to create a logical circuit pathway, providing at least one housing having a front surface coupled to a back surface, the front surface including one or more node apertures, wherein the housing is configured to removably receive or otherwise contain a functional tile unit between the front surface and back surface such that the nodes can be made to align with the one or more node apertures, and arranging a subset of the plurality of functional tile units and the plurality of connector tiles to achieve an intended binary logical function result.

In an embodiment, a system for teaching Boolean Logic can comprise at least one functional tile unit, a housing, and at least one connector tile. The at least one functional tile unit can include one or more nodes representing binary values of a logical circuit pathway and one or more logical segments connecting the one or more nodes. The nodes can include markings, such as "1" or "0", or have contrast colors such as green or red to represent binary values. The one or more logical segments can represent a binary function of the logical circuit pathway such that each of the one or more nodes connected by the logical segment represent an input node or an output node of the binary function. The housing can comprise a front surface coupled to a back surface including an opening along a portion of the perimeter that defines a space sized to removably receive and contain the functional tile unit. The front surface of the housing can comprise one or more node apertures configured to align with the one or more nodes. The at least one connector tile can include a line segment sized to connect the one or more nodes to indicate that the states between the nodes are the same value or have the same markings.

In another embodiment a method for teaching Boolean Logic can comprise providing a plurality of functional tile units and a plurality of connector tiles, arranging the functional tile units and the plurality of connector tiles according to one or more rules, and scoring the arrangement. Each of the functional tile units can include one or more nodes representing binary values of a logical circuit pathway and one or more logical segments sized to connect the one or more nodes. The logical segments can represent a binary function of the logical circuit pathway such that each of the connected nodes represent an input node or an output node of the binary function. Each of the plurality of connector tiles can include one or more line segments used to connect nodes of different functional tile units. Scoring of the created arrangement can be based on the number of functional tile units used, the number of connector tiles used, and the chosen logical segments.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
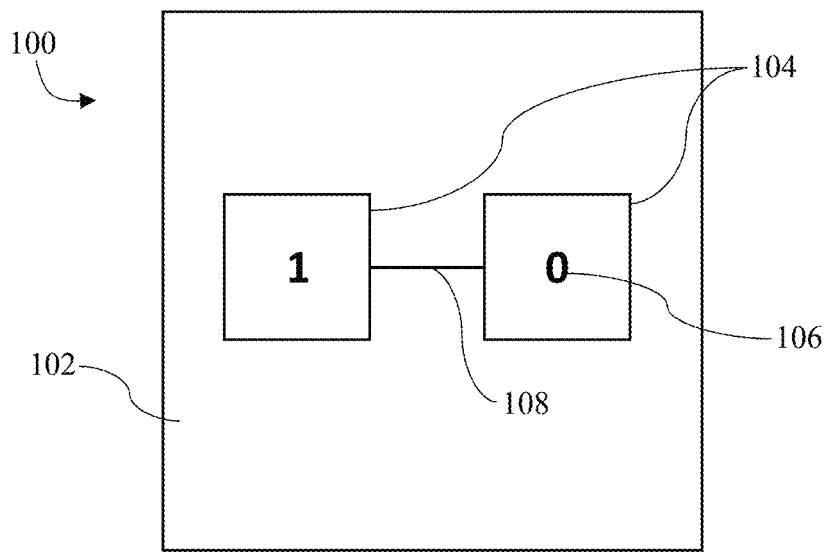
FIG. 1 is a planar view of a functional tile unit, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure comprises various embodiments of functional tile units and connector tiles that can be used to understand, demonstrate, and apply binary logic, Boolean logic, True or False logic, and programmable or customizable user defined logic such as "If this then that" (IFTTT) logic sequences. In some embodiments, the functional tile units enable a user to simulate real-world scenarios and applications without requiring electronic components. Embodiments of functional tile units directly engage a user by requiring the user to physically interact with the system to replicate loaded logic and program signals.

In embodiments, two primarily groups of tiles can be used, functional tile units and connector tiles. Functional tile units that can also be called logical tile units are used to emulate specific functions. For instance, in a signal circuit diagram, signals travel through a pathways or circuits that can be recreated using functional tile units and connector tiles.

In binary coding, signal states or values are can be displayed via various marking schemes such as "0" and "1" markings, "LOW" and "HIGH" markings, different color markings, or "OFF and "ON" markings. In embodiments, such binary states can be pre-established and mapped in a set of nodes, and can be visually represented as pattern on a functional tile unit. In such embodiments, the nodes can be connected by a logical segment on the tile surface. Furthermore, an entire circuit can be built using a plurality of function tile units linked by connector tiles between nodes.

In embodiments, connector tiles can comprise different shapes such as rectangular or "I" or "L" or "S" shaped and can be flat or cuboids to match the functional tiles geometry. Connector tiles serve to bridge or connect one or more functional tile units and to provide physical continuity between the functional tile units. Connector tiles serve as pathways to demonstrate the flow of signal or logic sequence from the nodes, between the functional tile units. The connector tile has a line segment on their surface to represent the connect ability feature of these tiles. Such connections between functional tiles and connectors tiles or between themselves are made such that the nodes of such tiles connect or mate to represent connectivity between the tiles.

For instance, the user can demonstrate an IFTTT logic using the tiles. The user can connect functional tile units to show if two events or two states go from "0" to "1" or "Off" to "ON" then an output state changes to a "1" or "ON". Such state changes can also be pre-established or customizable or user defined on the functional tile units using logical segments.

When referring to logic functions as predetermined, the term predetermined includes conventional logic functions, such as Binary Logic, Boolean Logic, and IFTTT Logic, as well as user defined logic. As such, a predetermined function may not necessarily be permanently represented on a functional tile unit.

Referring now to FIG. 1, functional tile unit 100 is depicted according to an embodiment. Functional tile unit 100 generally comprises tile body 102, nodes 104, and logical segments 108. In embodiments, tile body 102 can be various shapes, such as rectangular, square, or circular. Each node 104 can represent signal states or values of binary coding through the use of markings 106. In embodiments, the signal states or values can be represented by "0" and "1" markings, "LOW" and "HIGH" markings, colored markings (e.g. green markings indicating on and red markings indicating off), "ON" and "OFF" markings, or any marking schemes on nodes 104 capable of representing distinct states. In embodiments, nodes 104 can be permanently incorporated or depicted on functional tile unit 100.

In embodiments, functional tile units can be two-sided, having a first set of nodes on a first side and a second set of nodes on a second side. In such embodiments, each node in the first set of nodes can correspond to a node in the second set of nodes by being positioned similarly.

Figure 2A:
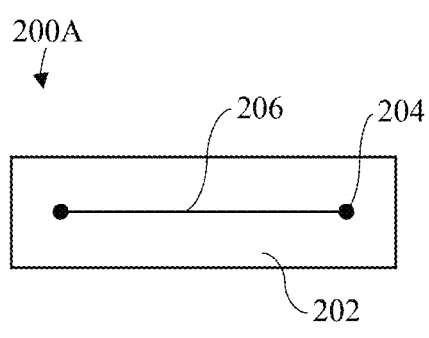
FIGS. 2A and 2B are planar views of connector tiles, according to embodiments.
Figure 2B:
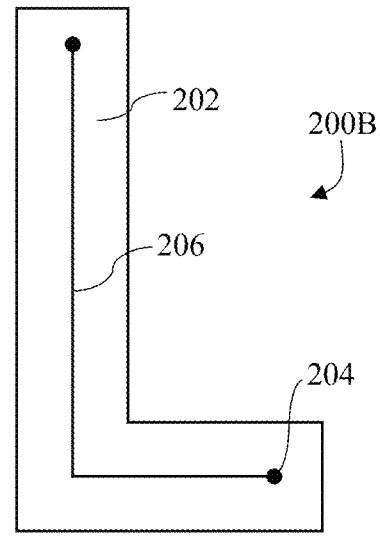

Referring now to FIGS. 2A-B, connector tiles 200A, 200B are depicted, according to an embodiment. Connector tiles 200A, 200B generally comprise connector body 202, connector segment ends 204, and connector line segments 206. Connector line segments 206 can terminate in connector segment ends 204. In embodiments, connector body 202 can comprise different shapes and patterns such as "I", "L", or "S" shapes and can be flat or three dimensional to match the functional tile units. In some embodiments, connector body 202 can be flush with connector segment ends 204 and connector line segments 206.

In operation, connector tiles serve to connect nodes 104 or entire functional tile units 100. Connector tiles serve as pathways to demonstrate the flow of signal or logic sequences from nodes 104, between the functional tile units. Such connections between functional tile units and connector tiles or between connector tiles themselves are made such that the nodes 104 of such tiles connect or mate to represent connectivity between the tiles.

Thus, functional tile units enable the Binary, Boolean, and user-defined Logic functionality to be easily represented to users. For example, a user can demonstrate an "If this then that" logic statement by arranging the functional unit tiles to show that if two events or two states go from "0" to "1" then an output state changes to a "1" from a "0". Such state changes can also be pre-established in the functional tile unit markings. In this manner, an entire circuit, and signal flow pathways can be built by connecting a plurality of functional tile units and with a plurality of connector tiles.

Figure 3:
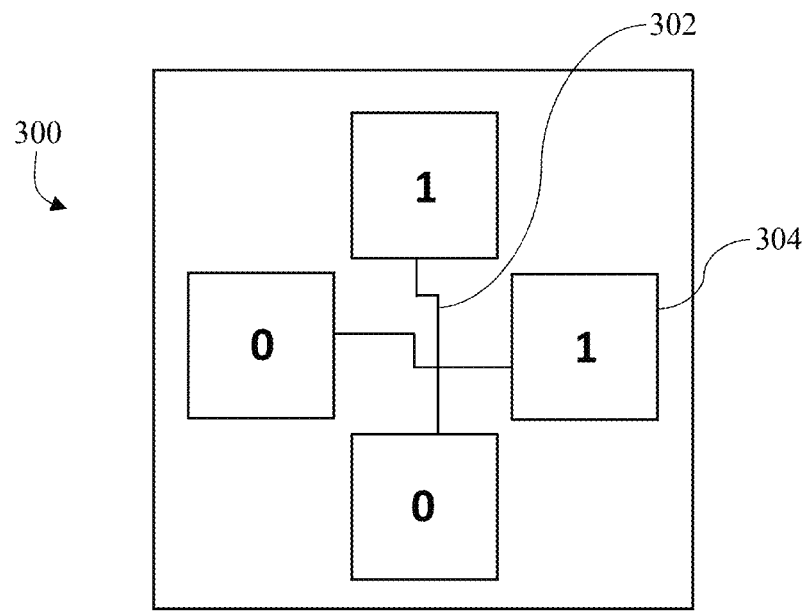
FIG. 3 is a planar view of a functional tile unit, according to an embodiment.

In embodiments, such as functional tile unit 300 depicted in FIG. 3, functional tile units can incorporate logical segments 302 to permanently represent certain logical connections between nodes 304. Logic states can be permanently represented as pre-defined logical segments ending with their respective nodes in individual functional tile units. In embodiments, a single functional tile can have multiple logical segments permanently represented. For example, functional tile unit 300 represents a binary state change of a "NOT" function. Logical segments 302 represent two logical segments that are equivalent to the two logical states of the Boolean "NOT" function. Table 1 shows the "NOT" gate table, including input node values and corresponding output values for the "NOT" function.

TABLE 1

NOT Gate Table
NOT Gate Table

| Input/Receiving | Output/Outgoing |
|---|---|
| 0 | 1 |
| 1 | 0 |

Thus, in FIG. 3 one logical segment 302 of an inverter or "NOT" gate maps a single receiving signal node 304 of "1" to an outgoing signal node 304 of "0". A second logical segment 302 for the same "NOT" gate will map the reverse, connecting a receiving signal node 304 of "0" to an outgoing signal node 304 of "1".

In embodiments, a functional tile unit can have multiple logical segments. In some embodiments, logical segments can even overlap to depict different receiving and outgoing values for a pre-established function. Furthermore, in some situations where the number of receiving nodes is equal to the number of outgoing nodes it is possible for a user to treat a receiving node as an outgoing node and vice versa by mere orientation of the tile surface relative to other tile groups.

Figure 4:
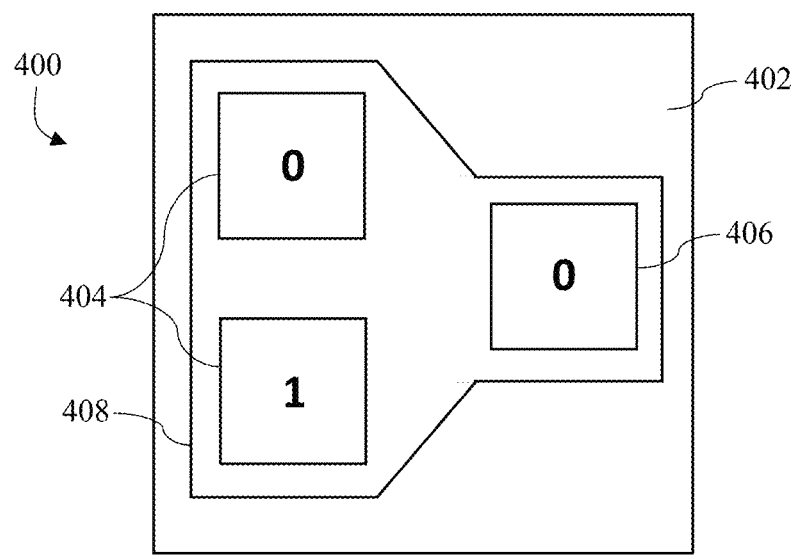
FIG. 4 is a planar view of a functional tile unit with a logical segment, according to an embodiment.

FIG. 4 depicts functional tile unit 400 representing the "AND" function of Boolean Logic, according to an embodiment. Functional tile unit 400 comprises tile surface 402, receiving nodes 404, output node 406, and logical segment 408. Logical segment 408 can contain multiple receiving signal nodes 404 and a single outgoing signal node 406. In Boolean logic, in the "AND" function, there are at minimum two receiving signal nodes 404 and one output signal node 406. In embodiments, logical segments can function similarly as connector line segments to represent, and contain various combinations of receiving signal nodes and outgoing signal nodes.

In embodiments, one or more logical segments can be represented on tile base. In embodiments, logical segments can be pieces separate from functional tile units that can be positioned over various nodes to represent different logic circuits. In embodiments, logical segments can be optimally arranged radially outward terminating at set nodes and in a manner sharing any common receiving or outgoing state points without much hindrance.

Figure 5:
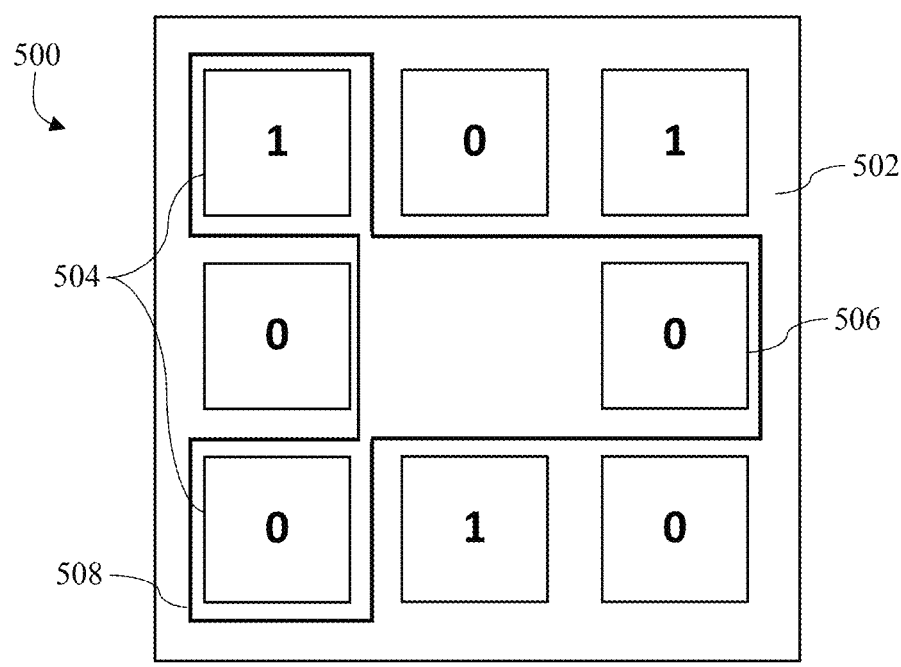
FIG. 5 is a planar view of a functional tile unit with a highlighted logical segment, according to an embodiment.

FIG. 5 depicts functional tile unit 500 according to an embodiment. Functional tile unit 500 includes tile surface 502 and nodes 504. Logical segment 508 can be used on functional tile unit 500 to identify the binary states of two receiving nodes 504 and one outgoing node 506 to represent one possible Boolean Logic state combination for the 'AND' function. In embodiments, logical segment 508 can be positioned around each side of functional tile unit 500 such that every input and output combination for the 'AND' function is represented. In such an embodiment, logical segment 508 can indicate the output node by its position on the tile, custom letterings, directional cues (e.g. a left to right direction scheme), color patterns, or any other marking scheme capable of visually distinguishing input nodes from output nodes. Table 2 shows the "AND" gate table, including input node values and corresponding output values for the "AND" function.

TABLE 2

| AND Gate Table | | |
| --- | --- | --- |
| AND Gate Table | | |
| Input 1/Receiving 1 | Input 2/Receiving 2 | Output/Outgoing |
| 0 | 0 | 0 |
| 0 | 1 | 0 |
| 1 | 0 | 0 |
| 1 | 1 | 1 |

Each line item in the gate table in Table 2 represents a possible logical segment on a functional tile unit representing the "AND" function. Since the nodes have binary states, each logical segment can leverage or share nodes between them as illustrated in FIGS. 8A, 8B, 8C, and 8D.

These different logical segments can be selected by simply turning or orienting the tile to the desired one out of four logical segments relative to the other tiles or relative to the arrangement of tile units forming signal pathways. Receiving and input nodes are interpreted to be synonymous in this context and are used interchangeably. Similarly outgoing and output are synonymous and interchangeable in this context.

Similarly, functional tile units can be designed for many such Boolean operands such as "OR", "AND", "NOR", "NAND", "XOR", "XNOR", and other custom user defined functional operands. Functional tile units can have one or more inputs or receiving nodes and one or more output or outgoing nodes. In embodiments, a functional tile can illustrate a single binary logical segment such as a "0" or "1". In embodiments, logical segments can include at least one logical operand, such as a Boolean Logic operand.

Figure 6:
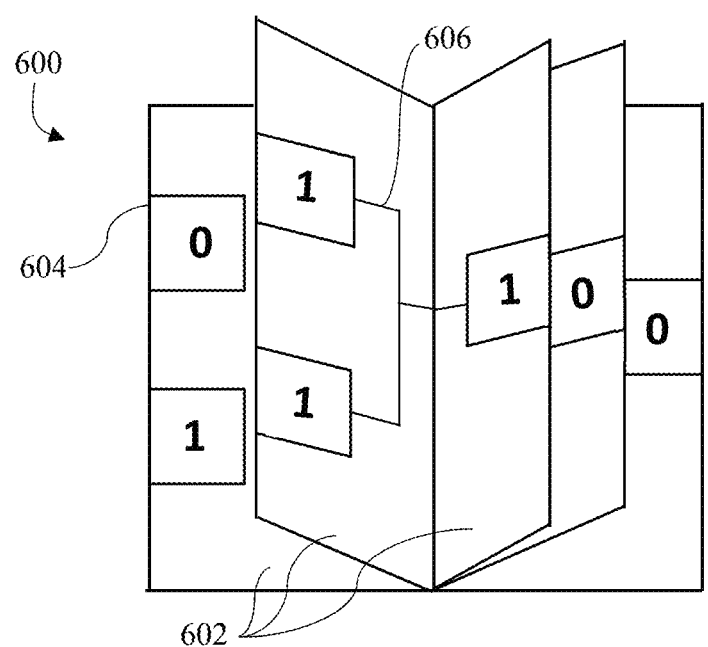
FIG. 6 is a perspective view of a functional tile booklet, according to an embodiment.

Referring now to FIG. 6, a functional tile designed like a booklet and referred to as functional tile booklet 600 is depicted according to an embodiment. Functional tile booklet 600 comprises a plurality of folding tile pages 602 with pairs of folding tile pages 602 configured to form functional tile units when laid flat. Each folding tile page 602 can comprise one or more nodes 604 and one or more logical segments 606. In embodiments, functional tile units can be selected by a user like leaflets or pages of a book, wherein each of a pair of visible or open pages form a functional tile unit. In embodiments, the user can turn the pages to find a desired functional tile unit before using one or more logical segments 606 to identify a logical function, such as the 'AND' function. In embodiments, nodes 604 of each folding tile page 602 can align such that various combinations of nodes can be represented within functional tile booklet 600 without changing the layout of nodes 604.

Figure 7A:
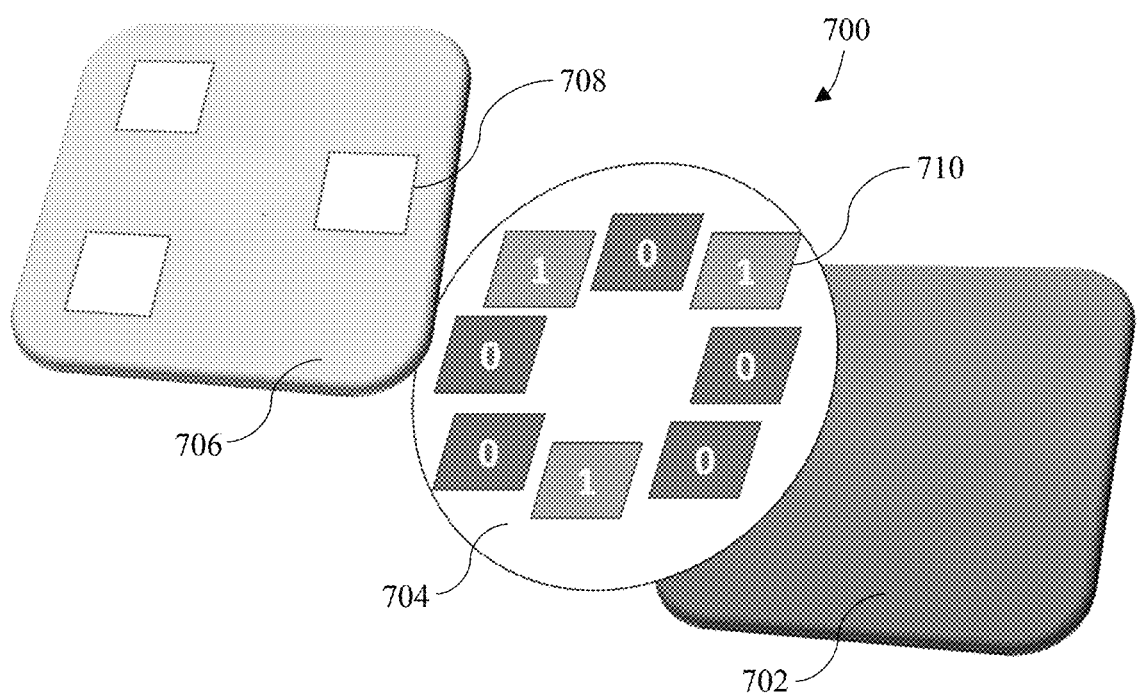
FIG. 7A is a perspective exploded view of a rotatable functional tile unit, according to an embodiment.
Figure 7B:
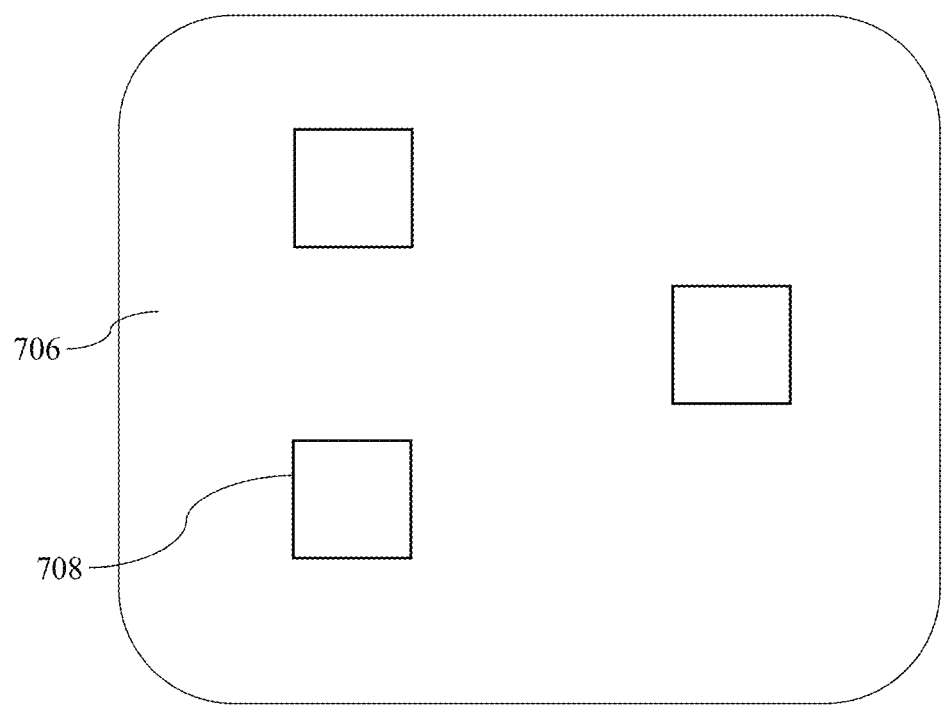
FIG. 7B is a planar view of a front surface of the rotatable functional tile unit of FIG. 7A.
Figure 7C:
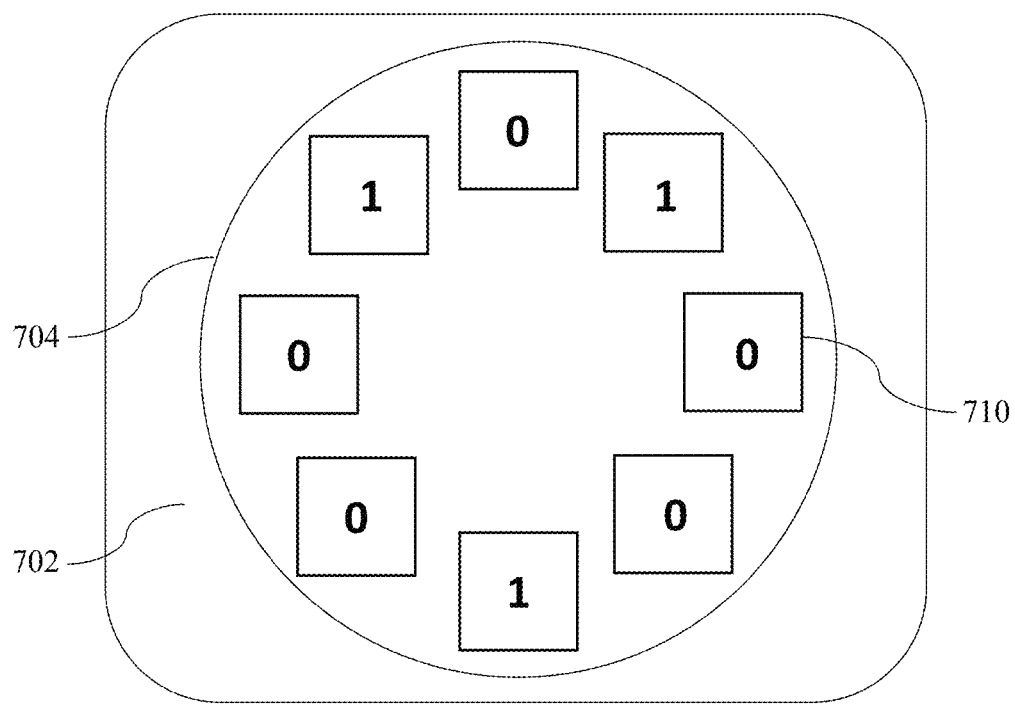
FIG. 7C is a planar view of a rotatable functional tile unit and a backing surface of the rotatable functional tile device of FIG. 7A.
Figure 8A:
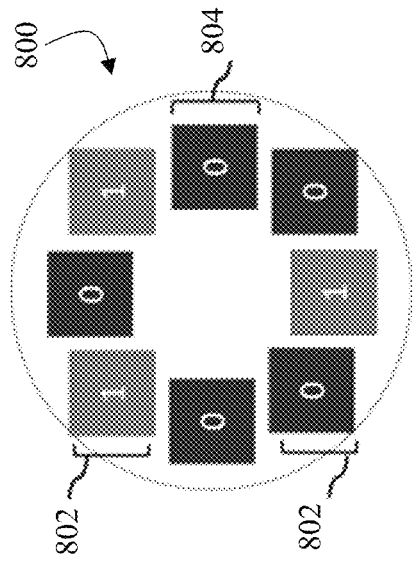
FIGS. 8A, 8B, 8C, and 8D are planar views of orientations of a rotatable functional tile, according to embodiments.
Figure 8B:
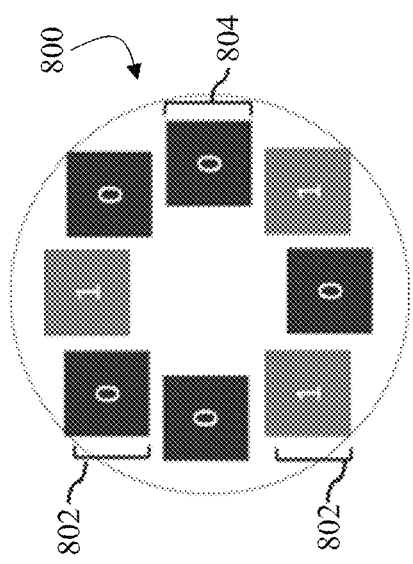
Figure 8C:
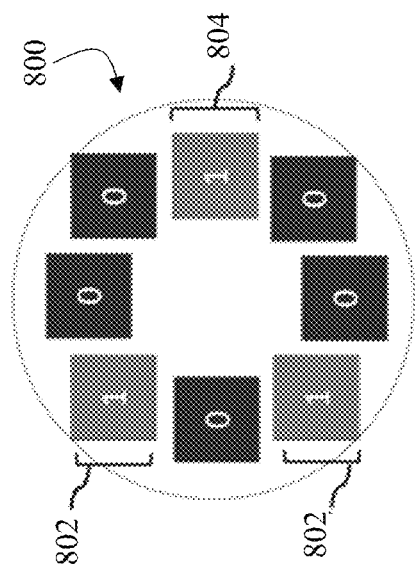
Figure 8D:
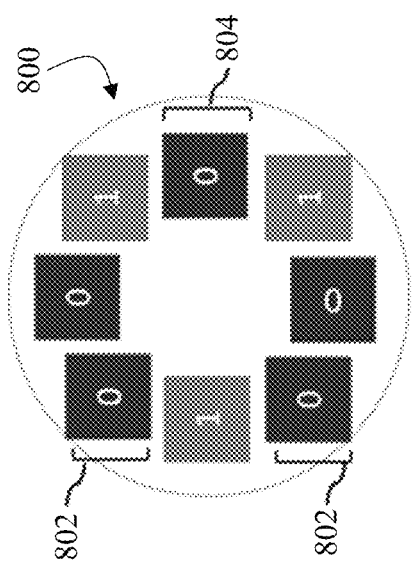

FIGS. 7A-C depict rotatable functional tile device 700 including backing surface 702, functional tile unit 704, and front surface 706. Front surface 706 can include one or more node apertures 708 through which nodes 710 included on functional tile unit 704 can be seen. In embodiments, functional tile unit 704 can rotate relative to backing surface 702 and front surface 706 such that different node combinations representing the different logical segments can be viewed through node apertures 708. In embodiments, node apertures 708 and nodes 710 can be similarly sized and arranged such that each node aperture 708 reveals only one node 710 and its respective markings. The isolation of only relevant nodes 710 enables a user to easily focus on input or receiving nodes and output or outgoing nodes. In embodiments, a user can turn or rotate functional tile unit while front surface 706 and backing surface 702 remain stationary. The fixed position of front surface 706 provides consistent and stationary connection spots for connector tiles to be placed around node apertures 708. In embodiments, front surface 706 and backing surface 702 can be coupled along one or more edges.

As previously described, functional tile unit 704 can be rotated such that the different nodes can be seen. FIGS. 8A-8D depict a functional tile unit 800 in various positions such that different input nodes 802 and output nodes 804 could align with a front surface, such as front surface 706. This allows the user to build a circuit pathway by connecting the connector tiles to various node combinations.

Figure 9:
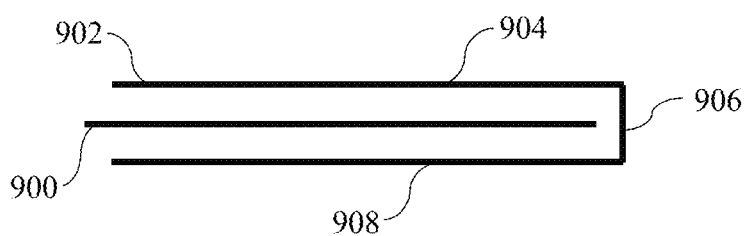
FIG. 9 is a side view of a functional tile unit and a housing with a gap, according to an embodiment.

FIG. 9 depicts a side view of functional tile unit 900 and housing 902 according to an embodiment. Housing 902 can comprise front surface 904, sidewall 906, and backing surface 908. In embodiments, front surface 904 and backing surface 908 can be substantially the same as front surface 706 and backing surface 702 respectively. In embodiments, front surface 904 and backing surface 908 can be coupled along at least one edge via sidewall 906. In operation, functional tile unit 900 can be slid into an opening between front surface 906 and backing surface 902 such that nodes on functional tile unit 900 align with node apertures on front surface 906. In embodiments, housing 902 can further sized and configured to align functional tile unit 900 within opening. In such embodiments, various functional tile units can be interchanged with one housing. Embodiments can have housing 902 permanently contain an assigned functional tile unit for consistency of operation.

Figure 10:
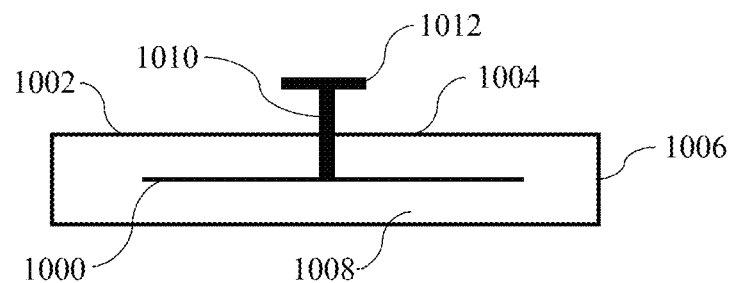
FIG. 10 is a side view of a functional tile unit and a housing, according to an embodiment.

FIG. 10 depicts the coupling of functional tile unit 1000 with housing 1002 according to an embodiment. Housing 1002 can comprise front surface 1004, sidewalls 1006, and backing surface 1008. In embodiments, functional tile unit 1000 has a center shaft 1010 perpendicular to its surface attached by a fastener, adhesive and bonding agents, or other coupling arrangement, that passes through a center aperture of front surface 1004. Center shaft 1010 can optionally comprise shaft cap 1012. Center shaft 1010 enables rotation of functional tile unit 1000 while functional tile unit 1000 is within housing 1002. Such an arrangement eliminates the need for a gap between the front surface and the back surface, such as that depicted in FIG. 9.

In embodiments, a similar rotation concept as that shown in FIG. 10 can be applied to individual nodes of functional tile units, enabling a user to manually select values for each node.

In embodiments, desired or active logical segments on the functional tile units can be oriented to form a left to right flow, so that the receiving nodes are on the left side and corresponding outgoing nodes are on the right of each functional tile unit. Such an orientation allows multiple functional tile units to be connected to each other either directly or using the connector tiles such that the output of one tile connects to the input of the next adjacent tile to denote a circuit pathway and multiple input states and output states of a function as depicted in FIG. 11.

A user can juxtapose various functional tile units and connector tiles such that the nodes of functional tile units and line segments of connector tiles meet to emulate logical circuit pathways. These logical circuit pathways can be used to form various pathways and branch pathways from a starting point(s) to a finishing point(s). In embodiments, users can be tasked with forming certain logical circuit pathways to achieve various objectives or goals. In embodiments, functional tile units and connector tiles enable users to connect, map, and arrange the overall signal flow and logical circuit pathways that can simulate real life scenarios and modes of operation.

Figure 11:
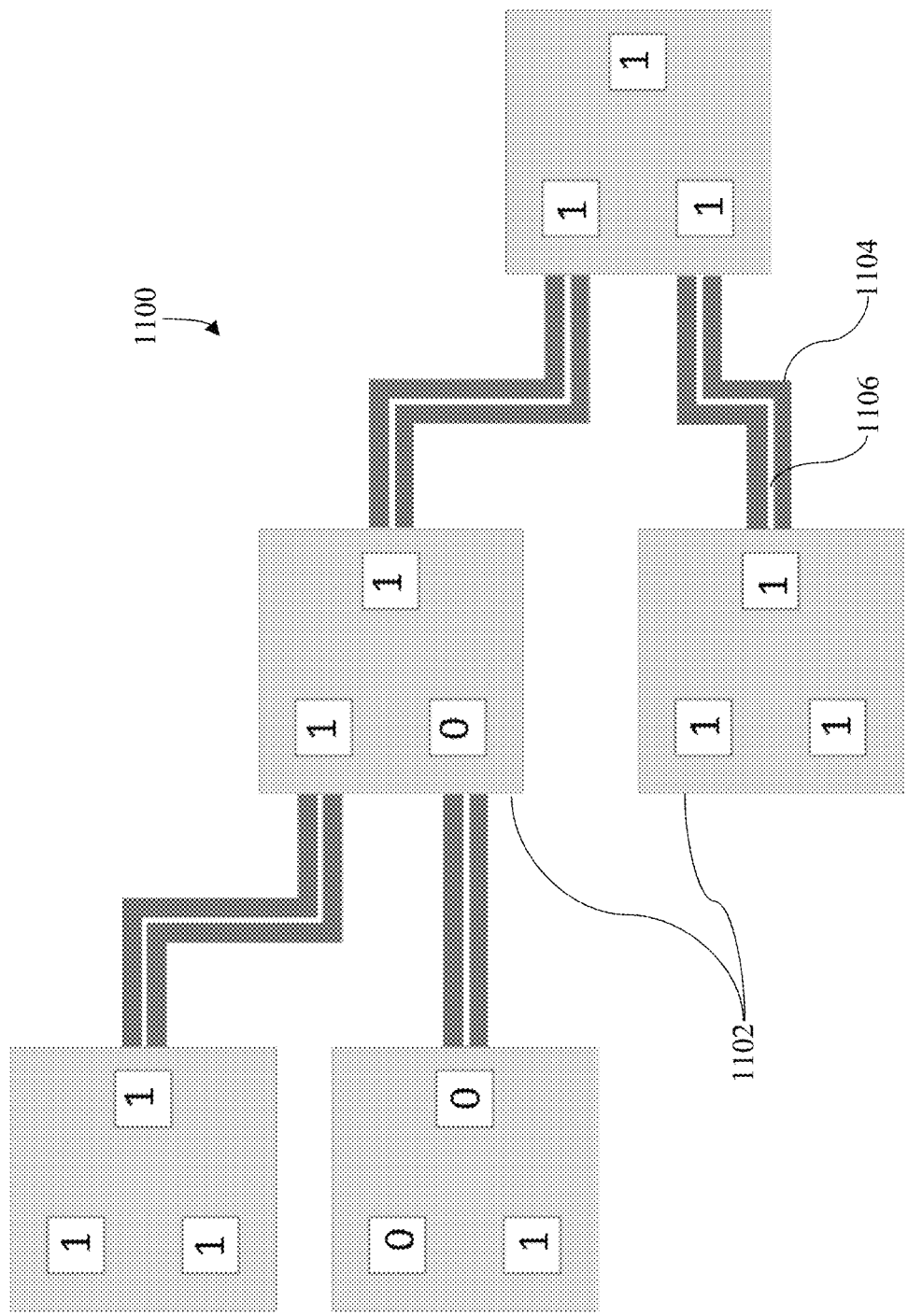
FIG. 11 is a planar view of a logical circuit pathway including functional tile units and connector tiles, according to an embodiment.
Figure 12:
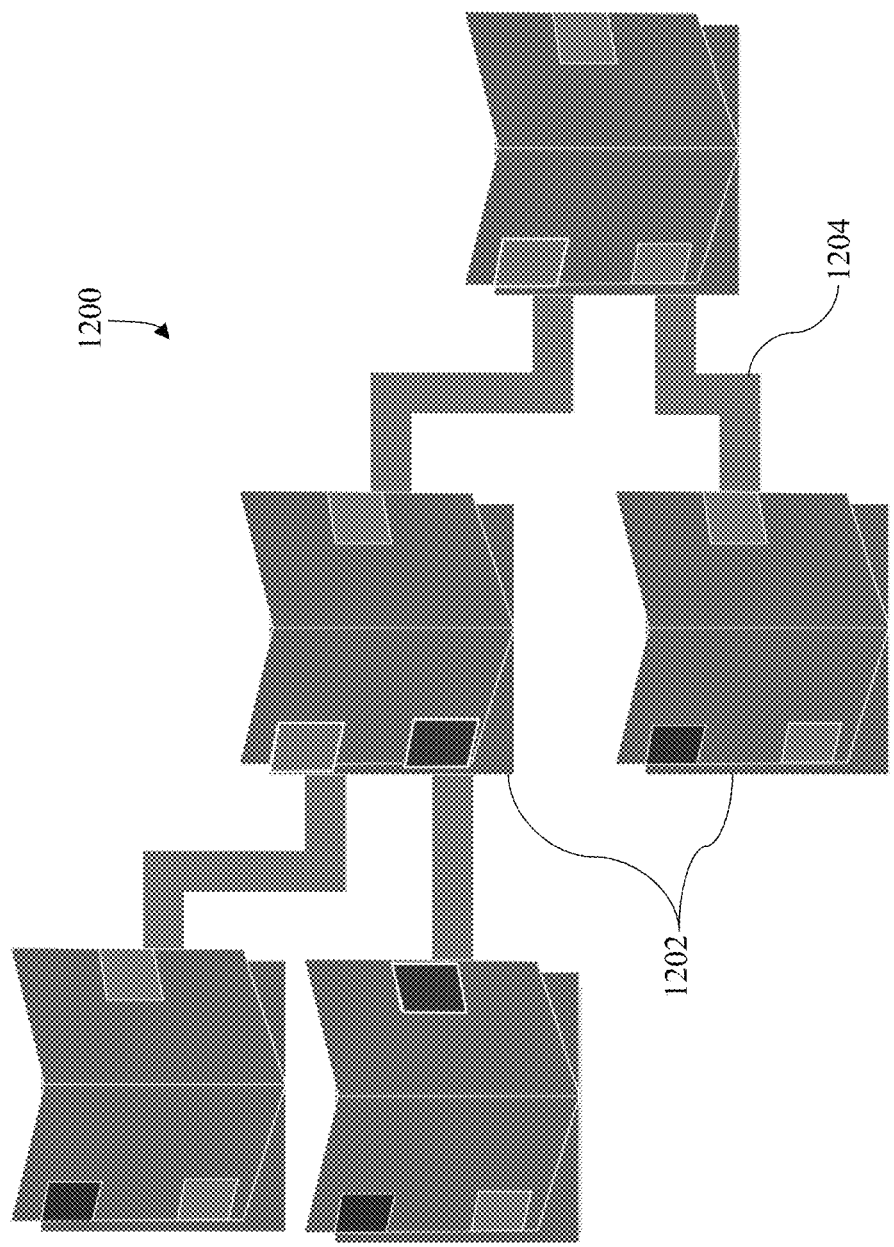
FIG. 12 is a perspective view of a logical circuit pathway including functional tile booklets and connector tiles, according to an embodiment.

FIG. 11 depicts a signal flow circuit pathway 1100 incorporating several functional tile units 1102 and connector tiles 1104 with line segments 1106. Similarly, FIG. 12 depicts a logical circuit pathway 1200 comprising functional tile booklets 1202 and connector tiles 1204 according to an embodiment. In such embodiments, a user can turn the pages on the tile surface to select a desired logical segment and thereby alter the overall state of the logical circuit pathway. At any given point in time, a user can change or alter the active logical segment on a functional tile by any of the several ways discussed above, such as by rotating a functional tile unit with multiple logical segments where each logical segment denotes different input states and output states of a function.

With a circuit pathway arrangement, a user can also trace a signal state from left to right while moving through functional and connector tiles. For instance, if a user starts with "1" at the first outgoing node on the first functional tile, the user can adjust the next functional tile logic segments receiving node that is connected to the first outgoing node via a connector tile to also be a "1" and so on. Thus, a user can emulate a Boolean logic or any other programmable logic and user defined logic by using such functional tile units and connector tiles.

The left to right flow suggested in some embodiments represents an exemplary frame of reference. A user can alternatively use any other frame of reference so long as the user is consistent. For example, functional tile units can be arranged such that the logic flows top to bottom or right to left, or bottom to top and so on. Unilateral directionality and coherent branching are therefore said to convey and understand means of deploying a mode of operation.

In operation, a user can adopt two simple rules to nurture the method of play for learning Boolean Logic. A first rule is for the user to pick a direction of arrangement for functional tile units, as in; place first functional tile, then a connector tile or set of connector tiles connecting the output node or nodes of the first or left functional tile to the receiving nodes on the next and adjacent functional tile on the right, and so on, essentially assembling the logical circuit pathway connections from left to right or in the chosen direction of arrangement. The second rule is to ensure that the markings or values on the nodes of functional tiles sharing a connector tile are the same. Since a connector tile can connect a prior functional tile's output node to a next functional tile's receiving or input node, this rule governs the markings or the value state between the connection tile are the same value, emulating the flow of data, such as a binary byte, analogous to real world technologies. For instance, "ON" or "Green" or "1" from one functional tile node or terminal should be connected respectively to another "ON" or "Green" or "1" in the adjacent functional tile node. By combining these two simple rules, the operation of a logical or functional circuit pathway can be effectively and accurately emulated. Furthermore, a predefined set of tiles of both groups can be provided to users and to assess the user's functional mapping of the pathways, and to determine scores based on the selected functional tile units and number of functional tile units used in constructing the pathway. A logically similar pathway can be built using fewer or optimal number of tiles which presents several games and learning strategies.

In embodiments, functional tile units can be 3-dimensional, such as in the form of a cube, where logical segments are depicted on each surface of the cube. In such embodiments, the connector tiles can also be 3-dimensional geometry. In embodiments, the dimensions of connector tiles can match the dimensions of functional tile units.

In embodiments, a single functional tile unit can include a single logical segment on a top surface and a single logical segment on a bottom surface. Such embodiments could be used for beginner learning needs or used for users with special cognitive needs or disabilities. However, for optimization, including ease of use with the tiles, increasing engagement or challenge levels, and reducing the number of tiles manufactured it is desired to have multiple logical segments on a single surface of a functional tile unit.

In embodiments, functional tile units can be configured to include electronics for illumination and signal visualization. In such embodiments, functional tile units can comprise light emitting sources (e.g. light emitting diodes or LEDs) and power sources such that the functional tile unit can illuminate. In embodiments, common or readily available light emitting diodes LEDs can be coupled to the nodes either under the node's location or on the surface of the functional tile unit. In such embodiments, nodes can be made of translucent material to allow passage of light emanating from the LEDs.

In embodiments, different color LEDs can be deployed at various nodes to represent different markings or binary values. For example, to covey green or "1" markings, a green LED can be used, and to convey a red or "0" marking a red led can be used. In such embodiments, a power source, such as a conventional direct current battery or a solar chargeable panel source can be used to power light emitting sources such as LEDs.

Figure 13:
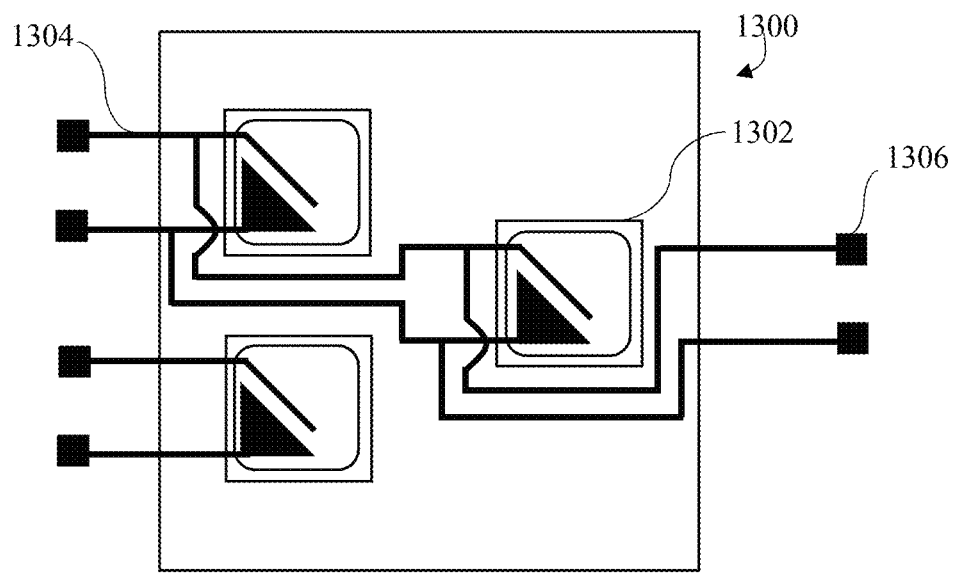
FIG. 13 is a planar view of a functional tile unit incorporating electronics, according to an embodiment.

Referring now to FIG. 13, an electronic functional tile unit 1300 is depicted according to an embodiment. Electronic functional tile unit 1300 can include light emitting nodes 1302, conductive filaments 1304, and conductive pads 1306.

Figure 14:
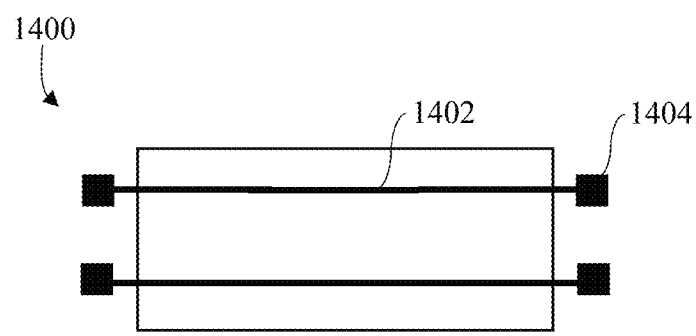
FIG. 14 is a planar view of a connector tile incorporating electronics, according to an embodiment.

FIG. 14 depicts electronic connector tile 1400 configured to connect between light emitting nodes and conductive pads contained within the electronic functional tile units. Electronic connector tile 1400 can comprise conductive filaments 1402 and conductive pads 1404.

Figure 15:
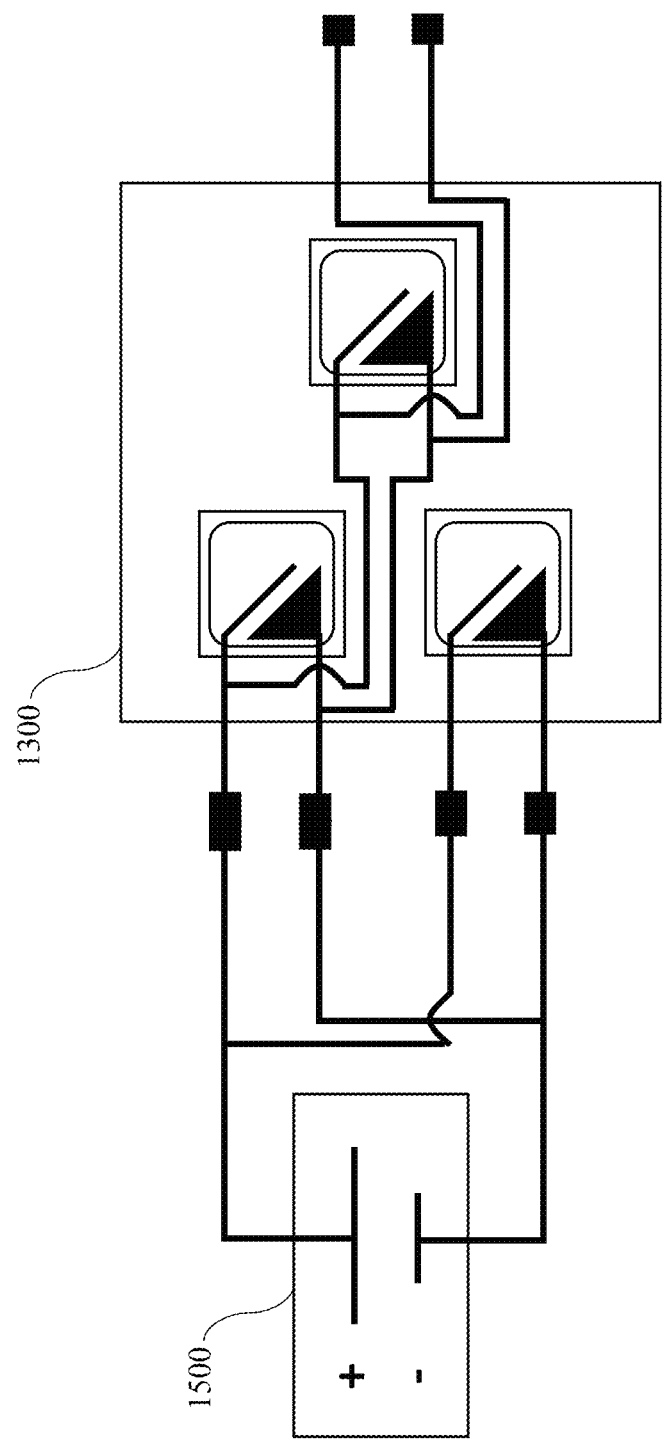
FIG. 15 is a planar view of a functional tile unit incorporating electronics and a power source, according to an embodiment.

FIG. 15 depicts power source 1500 electrically coupled to electronic functional tile unit 1300 according to an embodiment.

In embodiments, conductive filaments could be commonly available insulated wires such as insulated copper wires, conductive ink can also be traced on the surfaces to form the conductive filaments. In embodiments, the conductive filaments can terminate at mating conductive pads that enable quick and reliable connection points between electronic functional tile units and electronic connector tiles to form closed electrical circuit paths. In embodiments the conductive pads can comprise magnets and ferromagnetic material to attract and maintain reliable electrical connection. For example, the connector tile conductive pads can be made of ferromagnetic material while the conductive pads in the functional tiles can be made of magnets resulting in a secure connection. Such an embodiment eliminates the need for ensuring mating polarities in magnets.

In embodiments, conductive pads can be removably coupled using one or more of hook and loop fastening strips, magnets, buttons, or other attachment means.

While the disclosure has been described in detail and with reference to various embodiments thereof, it will be apparent to one skilled in the art that various changes and modifications can be made therein without departing from the spirit and scope of the embodiments. For instance, concepts of Business Risk, Science, Math equations or Programming technology or engineering principles can be taught using these tiles. For instance, the tile pathway could be labelled letters instead of logic segments or could be arranged to resemble a chemical equation or a math equation symbols or Boolean logic functions. Thus, it is intended that the present disclosure cover the modifications and variations of this disclosure provided they come within the scope of the appended claims and their equivalents.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

The invention claimed is:

1. A system for teaching logical systems, comprising: a functional tile device, said functional tile device including a housing having a front surface coupled to a back surface, the front surface including a plurality of node apertures, and a plurality of logical segments disposed within a replaceable and rotatable circular functional tile, wherein the housing is configured to permit the replaceable and rotatable functional tile to align one or more of the logical segments with the node apertures and wherein the logical segments are variable and selected by a user.

2. A system for logical systems, comprising: a functional tile device with a housing having a front surface with a plurality of node apertures, and a back surface, a replaceable and rotatable circular functional tile having plurality of logical segments, wherein each logical segment connects to at least one or more nodes on the housing and represents a predetermined function such that each of the connected nodes represent at least one or more input node or an output node of the predetermined function.

3. A method for teaching logic systems, comprising: providing a plurality of functional tile devices each including a housing having a front surface coupled to a back surface, the front surface including one or more nodes representing logical function values, and a replaceable and rotatable circular functional tile with user selectable one or more logical segments, wherein each logical segment connects at least two nodes and represents a predetermined function such that each of the connected nodes represent an input node or an output node of the predetermined function; permitting the user to arrange a subset of the plurality of functional devices to achieve an intended logical function result.

* * * * *